US012587408B2

(12) United States Patent
Beitlich

(10) Patent No.: US 12,587,408 B2
(45) Date of Patent: Mar. 24, 2026

(54) LINE REPLACEABLE UNIT AIRCRAFT DATA PREDICTION AND CONFIGURATION

(71) Applicant: Hamilton Sundstrand Corporation, Charlotte, NC (US)

(72) Inventor: Ryan Beitlich, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 161 days.

(21) Appl. No.: 18/465,470

(22) Filed: Sep. 12, 2023

(65) Prior Publication Data

US 2025/0088386 A1     Mar. 13, 2025

(51) Int. Cl.
*H04L 12/40*          (2006.01)

(52) U.S. Cl.
CPC .................. *H04L 12/40006* (2013.01); *H04L 2012/40215* (2013.01); *H04L 2012/4028* (2013.01)

(58) Field of Classification Search
CPC ..... H04L 12/40006; H04L 2012/40215; H04L 2012/4028; H04L 67/12; G05B 13/026; G05B 13/0232; G05B 13/0235; G05B 13/0237; G05B 13/0283; G05B 23/0232; G05B 23/0235; G05B 23/0237; G05B 23/0283; G07C 5/006; G07C 5/008; G07C 5/0808; G07C 5/858; G07C 5/085; B64F 5/60; B64D 2045/0085; G05G 11/0739; G05G 11/0787
See application file for complete search history.

(56) References Cited

U.S. PATENT DOCUMENTS

| | | | | |
|---|---|---|---|---|
| 6,148,179 | A | * 11/2000 | Wright | G08G 5/55 |
| | | | | 455/66.1 |
| 6,973,479 | B2 | 12/2005 | Brady, Jr. et al. | |
| 7,809,527 | B2 | 10/2010 | Bailly et al. | |
| 8,649,613 | B1 | * 2/2014 | Leung | G06F 18/2323 |
| | | | | 382/156 |
| 8,981,967 | B1 | 3/2015 | Shore et al. | |
| 9,921,823 | B2 | * 3/2018 | Gadgil | G06F 8/65 |
| 9,969,508 | B2 | 5/2018 | Szeto | |
| 10,127,175 | B2 | 11/2018 | Pronto et al. | |

(Continued)

OTHER PUBLICATIONS

Search Report issued in European Patent Application No. 24196807. 2; Date of Mailing Jan. 24, 2025 (10 pages).

*Primary Examiner* — Stephen J Clawson
(74) *Attorney, Agent, or Firm* — CANTOR COLBURN LLP

(57)          ABSTRACT

A line replaceable unit (LRU) includes a data communication interface configured to receive identification (ID) data from an aircraft communication bus, an aircraft systems interface configured to receive aircraft systems data corresponding to an operation of at least one aircraft system, and an LRU data interface configured to receive LRU data corresponding to the LRU. The LRU further includes a processor and a memory unit. The processor processes the aircraft systems data and the LRU data and determine at least one data category. The memory unit includes a plurality of data partitions. The processor is configured to generate at least one configuration data package by combining the ID data with one or both of the aircraft systems data and the LRU data, and to store the configuration data package in a given data partition based on the data category.

20 Claims, 2 Drawing Sheets

(56)                References Cited

U.S. PATENT DOCUMENTS

| | | | |
|---|---|---|---|
| 10,353,838 B1 | 7/2019 | Bantoft et al. | |
| 10,885,288 B2 | 1/2021 | Qian et al. | |
| 10,965,787 B2 * | 3/2021 | Redmond | G06F 16/116 |
| 11,030,828 B2 * | 6/2021 | Amit | G06F 16/25 |
| 11,206,520 B2 | 12/2021 | Rochau et al. | |
| 11,243,528 B2 * | 2/2022 | Cella | G06Q 30/02 |
| 11,661,212 B2 | 5/2023 | Srinivasalu | |
| 11,823,562 B2 * | 11/2023 | Sindhwani | G08G 5/53 |
| 2005/0148327 A1 * | 7/2005 | Perez | H04L 41/069 |
| | | | 455/431 |
| 2007/0027655 A1 | 2/2007 | Schmidt | |
| 2011/0040760 A1 * | 2/2011 | Fleischman | H04L 51/52 |
| | | | 707/E17.089 |
| 2015/0068289 A1 * | 3/2015 | Zhong | G01N 33/2888 |
| | | | 73/53.05 |
| 2015/0073648 A1 * | 3/2015 | Gu | F01D 17/20 |
| | | | 701/29.5 |
| 2015/0373110 A1 * | 12/2015 | Buehler | G06F 16/183 |
| | | | 709/213 |
| 2016/0196457 A1 | 7/2016 | Mylaraswamy et al. | |
| 2016/0269418 A1 * | 9/2016 | Sangary | G06F 21/44 |
| 2016/0290827 A1 * | 10/2016 | Cornell | G08G 5/20 |
| 2017/0088290 A1 * | 3/2017 | Szeto | G05B 23/0283 |
| 2018/0129447 A1 | 5/2018 | Kao et al. | |
| 2018/0146533 A1 * | 5/2018 | Goodman | G09G 3/3426 |
| 2018/0367211 A1 | 12/2018 | Loots et al. | |
| 2019/0024781 A1 * | 1/2019 | Chrungoo | G08G 1/0133 |
| 2020/0298993 A1 * | 9/2020 | Li | G08G 5/20 |
| 2020/0380875 A1 * | 12/2020 | Letsu-Dake | G08G 5/21 |
| 2021/0024224 A1 * | 1/2021 | Mohan | G07C 5/0808 |
| 2022/0157089 A1 * | 5/2022 | Srinivasan | G07C 5/008 |
| 2022/0237959 A1 | 7/2022 | O'Malley et al. | |
| 2022/0358845 A1 * | 11/2022 | Holmes | G08G 5/34 |
| 2023/0071496 A1 * | 3/2023 | Park | G05B 23/0235 |
| 2023/0127673 A1 * | 4/2023 | Chrysantos | G07C 5/0808 |
| | | | 701/3 |
| 2023/0418280 A1 * | 12/2023 | Emery | G05B 23/0283 |
| 2024/0087373 A1 * | 3/2024 | O'Brien | G07C 5/0808 |
| 2024/0132230 A1 * | 4/2024 | Adhikari | G07C 5/006 |
| 2024/0339038 A1 * | 10/2024 | Judd | H04L 67/12 |
| 2024/0412649 A1 * | 12/2024 | Camilleri | G08G 5/56 |
| 2025/0006067 A1 * | 1/2025 | Loupiac | G08G 5/22 |

* cited by examiner

LINE REPLACEABLE UNIT AIRCRAFT DATA PREDICTION AND CONFIGURATION

TECHNICAL FIELD

The present invention relates generally to aircraft systems, and more particularly, to a line replacement unit capable of performing data prediction and configuration.

BACKGROUND

A line replaceable unit (LRU) is a modular component of an aircraft that is replaceable in the field or at an operating station (e.g., a hanger) that is otherwise remote from a manufacturing facility, a maintenance depot, or other maintenance location. Some LRUs perform operational fault testing and store the results as fault data in non-volatile memory that can later be retrieved by a technician for further analysis. Most fault data only indicates whether the LRU passed a particular test, without much, if any contextual information about the LRU, at the time of the test. The fault data may only be retrievable from the non-volatile memory of some LRUs, by a technician, using specialized equipment either on board the aircraft or at a maintenance location (e.g., after the LRU has been removed from the aircraft). As such, LRU fault data is typically not easily obtainable and may only be of limited use in performing fault isolation and may provide a limited amount of information.

SUMMARY

According to a non-limiting embodiment, a line replaceable unit (LRU) includes a data communication interface configured to receive identification (ID) data from an aircraft communication bus, an aircraft systems interface configured to receive aircraft systems data corresponding to an operation of at least one aircraft system, and an LRU data interface configured to receive LRU data corresponding to the LRU. The LRU further includes a processor and a memory unit. The processor processes the aircraft systems data and the LRU data and determine at least one data category. The memory unit includes a plurality of data partitions. The processor is configured to generate at least one configuration data package by combining the ID data with one or both of the aircraft systems data and the LRU data, and to store the configuration data package in a given data partition based on the data category.

In addition to one or more of the features described above, or as an alternative to any of the foregoing embodiments, the ID data includes one or both of timestamp data and tail number stamp data via the data communication interface.

In addition to one or more of the features described above, or as an alternative to any of the foregoing embodiments, the at least one data category includes a LRU data, aircraft systems data, fault data, and test data; and In addition to one or more of the features described above, or as an alternative to any of the foregoing embodiments, the plurality of different data partitions includes an LRU data partition, an aircraft systems data partition, a fault data partition, and a test data partition.

In addition to one or more of the features described above, or as an alternative to any of the foregoing embodiments, the memory unit includes non-volatile memory (NVM) or static random access memory (SRAM) having a storage capacity ranging, for example, from about 500 megabytes (MG) to 2 terabytes (TB).

In addition to one or more of the features described above, or as an alternative to any of the foregoing embodiments, the data communication interface operates according to ARINC at least one of aeronautical radio, incorporated (ARINC) protocol controller area network (CAN), and time-triggered protocol (TTP).

In addition to one or more of the features described above, or as an alternative to any of the foregoing embodiments, the processor implements one or more algorithms to perform data prediction and trend analysis on a plurality of configuration data packages stored in the given data partition corresponding to the data category of the configuration data packages.

In addition to one or more of the features described above, or as an alternative to any of the foregoing embodiments, the processor is configured to store results of the data prediction and trend analysis in the given data partition corresponding to the data category of the configuration data packages.

In addition to one or more of the features described above, or as an alternative to any of the foregoing embodiments, the processor is configured to receive a data request via the data communication interface, and to deliver the configuration data package corresponding to the data request to the aircraft communication bus via the data communication interface.

In addition to one or more of the features described above, or as an alternative to any of the foregoing embodiments, the processor is configured to receive a data request via the data communication interface, and to deliver the results of the data prediction and trend analysis to the aircraft communication bus via the data communication interface based on the data request.

In addition to one or more of the features described above, or as an alternative to any of the foregoing embodiments, the processor is configured to establish signal communication with an external terminal device to receive a memory access request for at least one of a targeted configuration data package and results of a data prediction and trend analysis.

In addition to one or more of the features described above, or as an alternative to any of the foregoing embodiments, processor delivers at least one of the targeted configuration data package and the results of the data prediction and trend analysis to the external terminal device based on the memory access request.

According to another non-limiting embodiment, a method of storing data in a line replaceable unit (LRU) is provided. The method includes delivering identification (ID) data from an aircraft communication bus identification (ID) data from an aircraft communication bus to a data communication interface configured of the LRU, delivering aircraft system data from at least one aircraft system to an aircraft systems interface of the LRU, and delivering LRU data corresponding indicative of the operation of the LRU to an LRU data interface of the LRU. The method further comprises processing, using a processor of the LRU, the aircraft systems data and the LRU data and determine at least one data category, combining, using the processor, the ID data with one or both of the aircraft systems data and the LRU data to generate at least one configuration data package corresponding to the at least one data category, and storing, by the processor, the configuration data package in a given data partition among a plurality of different data partitions of the memory which corresponds to the data category.

DETAILED DESCRIPTION

Figure 1:
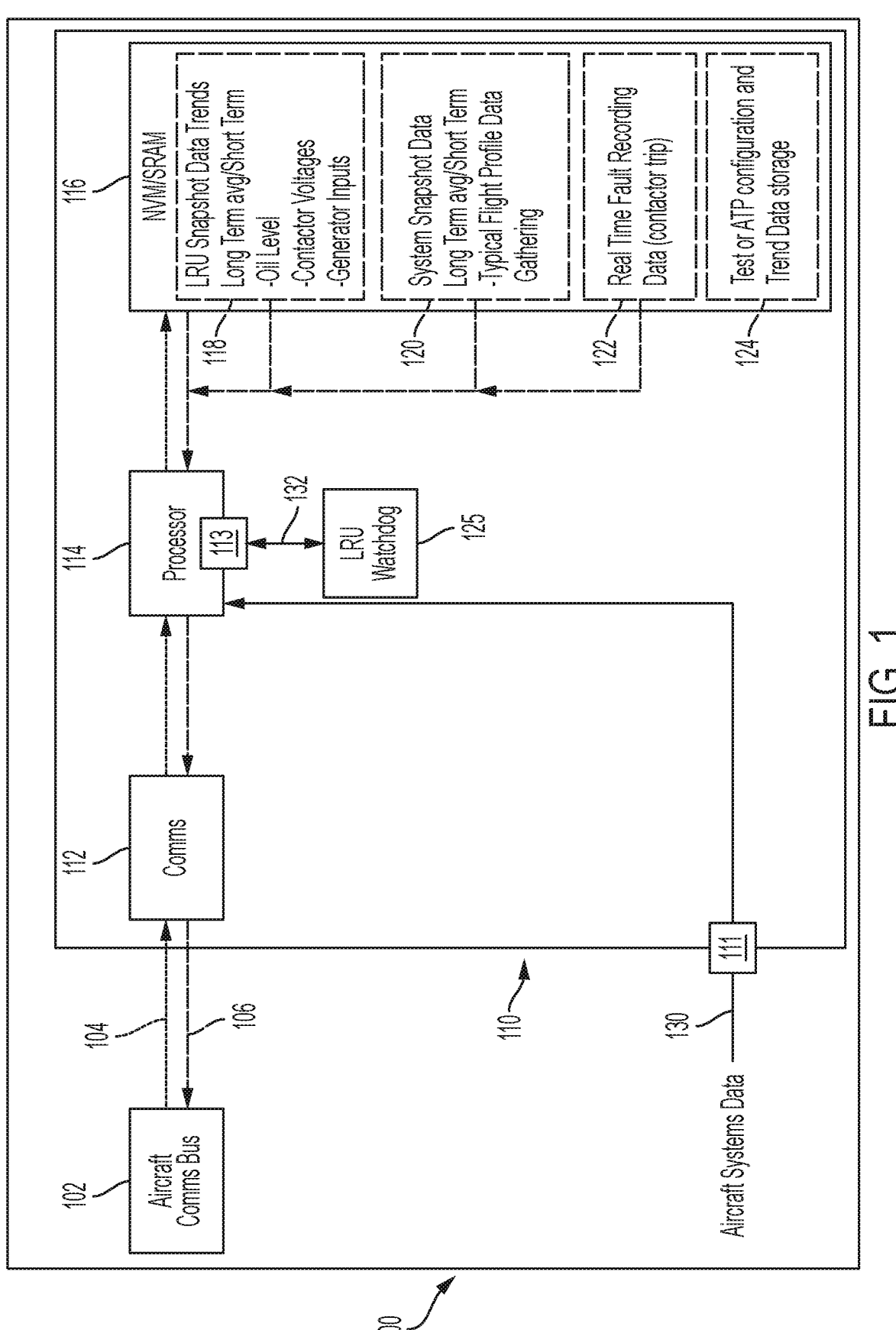
FIG. 1 is a block diagram illustrating a line replaceable unit in signal communication with an aircraft communication bus.

For the purposes of promoting and understanding the principles of the present disclosure, reference will now be made to the embodiments illustrated in the drawings, and specific language will be used to describe the same. It should nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features.

The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and/or a direct "connection" unless specified to the contrary in the claims below.

As used herein, the term "controller" or "processor" refers to processing circuitry, which may include an application specific integrated circuit (ASIC), an electronic circuit, a hardware controller, an electronic processor (shared, dedicated, or group) and memory that executes one or more software or firmware programs, a combinational logic circuit, and/or other suitable interfaces and components that provide the described functionality.

Turning now to a general overview of the relevant technologies, traditional LRUs typically do not contain identification (ID) information such as such as timestamp data (e.g., time of day, day of week, month, etc.) or aircraft tail number stamp data to store data in non-volatile memory (NVM) during faults or other events. Traditional LRUs also do not save configuration data or provide short-term or long-term data analysis of the LRU or the aircraft and does not save real time data associated with an aircraft fault to indicate a possible sequence of events that resulted in the failure. As a result, the data stored in the LRU provides a poor and incomplete understanding of any failures found.

Various non-limiting embodiments of the present disclosure provide a LRU capable of assigning information (ID) data to aircraft systems data and/or internal LRU configuration data to generate a combined configuration data package. The ID data includes, for example, such as timestamp data (e.g., time of day, day of week, month, etc.) or aircraft tail number stamp data. The LRU implements non-violate memory (NVM) and a processor that collects aircraft and LRU data. The processor saves the configuration data package, along with other data such as aircraft systems data, LRU configuration data, fault data, test data and/or maintenance data in the NVM. statistics, and store this short-term trend data and/or long-term trend data in the NVM. Accordingly, the configuration data package can be cross-referenced with the other types of data stored in the NVM to identify faults occurring in the aircraft and/or LRU and determine the status of the aircraft systems and/or LRU at the time the fault occurred.

According to a non-limiting embodiment, the LRU is configured to receive aircraft systems data and/or internal LRU configuration data and the processor is configured to save and process the aircraft systems data and/or internal LRU configuration data to predict data trends which can then be provided to the aircraft and/or or to customers as a data service subscription. The LRU described herein is therefore capable of providing detailed information pertaining to the current configuration of the aircraft configuration, a current failure mode, and/or the sequence of fault events associated with a particular failure, where each fault event is stored in NVM with corresponding dates, time, tail number, and the sequence of events occurring in the aircraft. In this manner, the processor can provide the configuration data package for the LRU that indicates the health of the aircraft generators, contactors, and other components.

Turning now to FIG. 1, a line replaceable unit (LRU) 110 is illustrated according to a non-limiting embodiment. The LRU is in signal communication with an aircraft communication bus 102 to receive ID data 104, also referred to as "low-priority data". The ID data 104 include timestamp data such as, for example, timestamp data a current time of day, day of week, month, etc. The timestamp data can also include aircraft tail number stamp data, which identifies the specific aircraft on which the LRU is installed.

The LRU 110 includes one or more aircraft systems interfaces 111, a data communication interface 112, an internal LRU data interface, a processor 114, and a memory unit 116. The aircraft systems interfaces 111 receives systems data 130 from a corresponding electrical system and/or mechanical system operating on the aircraft 100. The aircraft systems data includes 130 measured data output from a sensor such which provides measurements corresponding to oil temperature, power supply voltages, input current levels, voltage and/or current frequencies, fluid level data, contactor voltage level data, generator input voltage and current level data, generator output voltage and current level data, generator input voltage and frequency data, generator output voltage and current level data, and rotational speed. The aircraft systems data 130 can also include fault data provided by one or more fault detection systems installed on the aircraft 100. In addition, the aircraft systems data 130 can include real-time flight parameters of the aircraft 100 (e.g., take off events, cruising events, landing events, flight paths, etc.).

The data communication interface 112 includes various communication protocols including, but not limited to, the Aeronautical Radio, Incorporated (ARINC) protocol, controller area network (CAN), and time-triggered protocol (TTP). The data communication interface 112 facilitates the exchange of the ID data 104 from the aircraft communication bus 102 and the LRU 110. In addition, the data communication interface 112 can facilitate the delivery of output data 106 stored in the memory unit 116 to the aircraft communication bus 102. For example, prognostics data, short-term trend data and/or long-term trend data can be obtained from the memory unit and delivered to the aircraft communication bus via the data communication interface 112.

The internal LRU data interface 113 receives LRU data 132 that is indicative of the state and/or configuration of the LRU 110. The LRU data 132 includes, for example, interrupt signals, built-in test (BIT) signals, LRU status signals, and LRU configuration signals. This can also include signals for signal or data packet integrity such as parity or CRC checking. In one or more non-limiting embodiments, the LRU 110 includes an LRU diagnostic module 125 or "watch dog," which provides the LRU data 132.

The processor 114 is in signal communication with the aircraft systems interfaces 111, the data communication interface 112, the LRU data interface 113, and the memory unit 116. The processor 114 can process the ID data 104, the aircraft systems data 130 and the LRU data 132 to determine at least one data category. For example, data corresponding to a measured parameter of an aircraft system can be categorized as aircraft systems data, data corresponding to the LRU 110 can be categorized as LRU data, data corresponding to real-time flight parameters of the aircraft 100 (e.g., take off events, cruising events, landing events, flight paths, etc.) can be categorized as aircraft flight data, data corresponding to a detected fault or failure of the LRU 110 and/or the aircraft 100 can be categorized as fault data, and data corresponding to testing, diagnostics and/or maintenance performed on the LRU 110 and/or the aircraft 100 can be categorized as test data The memory unit 116 includes non-volatile memory (NVM) or static random access memory (SRAM) having a storage capacity ranging, for example, from about 500 megabytes (MG) to 2 terabytes (TB). The memory unit 116 includes a plurality of partitions 118, 120, 122 and 124 configured to store data delivered by the processor 114. The partitions 118, 120, 122 and 124 include, for example, an LRU data partition 118, an aircraft systems data partition 120, a fault data partition 122, and a test data partition 124. Although four data partitions are illustrated, it should be appreciated that more or less data partitions can be employed without departing from the scope of the present disclosure.

The LRU data partition 118 is configured to store LRU data associated with the LRU. The LRU data includes but is not limited to, snapshot data or a point-in-time copy of data, long-term trend data and short-term trend data associated with the LRU 110.

The aircraft systems data partition 120 is configured to store measured data associated with the various aircraft systems and/or a flight profile of the aircraft 100. The aircraft systems data includes, but is not limited to, snapshot data or a point-in-time copy of data, long-term trend data, short-term trend data associated with the various aircraft systems and/or the flight profile of the aircraft 100. In at least one non-limiting embodiment, the flight profile data is indicative of at least one flight event associated with the aircraft 100. The fight event includes, for example, altitude, thrust, atmospheric pressure, and flight status such as take-off information, cruising information, and landing information.

The fault data partition 122 is configured to store fault data associated with an aircraft system of the aircraft 100. The fault data is indicative of at least one fault event including, but not limited to, a short-circuit event, an open-circuit event, a contactor trip event, an over-voltage events, an over-heating event, etc. The fault data can also indicate a fault associated with the LRU 100. For example, the LRU diagnostic module 125 may perform a BIT operation that detects a fault with the LRU 110. In response to the BIT, the LRU diagnostic module 125 can generate fault data that is identified by the processor 114. The processor 114 can then store the LRU fault data 110 in the fault data partition 122.

The test data partition 124 is configured to store test data associated with testing, diagnostics and maintenance performed on the LRU 110. The test data partition 124 can also store short-term trend data and long-term trend data that can be used to perform prognostic analysis of the LRU 110. In one or more non-limiting embodiments, the test data is indicative of at last one test event performed on LRU 110, e.g., the LRU diagnostic module 125. Accordingly, the results of the test can be stored in the test data partition 124.

As shown in FIG. 1, the processor 114 is configured to intermittently receive the ID data 104 (e.g., time stamp data and tail number stamp data) via the data communication interface 112. Accordingly, the processor 114 can generate a configuration data package by assigning a given timestamp and the tail number stamp data to one or more of the ID data 104, the aircraft systems data 130 and/or the LRU data 132. The processor 114 is also configured to analyse the aircraft systems data 130 and/or the LRU data to determine whether it corresponds to at least one of a flight event, a fault event, and a test event. In this manner, the processor 114 can generate the configuration data package by assigning the given timestamp and the tail number stamp data to the determined corresponding event. For example, when the processor determines that aircraft systems data 130 (e.g., output voltage levels) received at a given time stamp is indicative of a fault event occurring in a corresponding aircraft system (e.g., the aircraft power system or generator), the processor 114 can assign the timestamp data to the aircraft systems data 130 to generate an aircraft systems configuration data package and can assign the timestamp data 104 to the fault event to generate a fault configuration package. In another example, the processor 114 can analyse the aircraft systems data 130 and determine that generator voltage parameters, rotational speed and oil pressure is indicative of a take-off flight event. Accordingly, the processor 114 can assign a timestamp data 104 to the take-off flight event to generate a flight configuration data package.

After generating a given configuration data package, the processor 114 can store the configuration management data package in a corresponding data partition 118, 120, 122, and 124. For example, the processor 114 can store LRU configuration data packages in the LRU data partition 118, can store aircraft systems configuration data packages in the aircraft systems data partition 120, can store fault configuration data packages in the fault data partition 122, and can store test configuration data packages in the test data partition 124.

According to a non-limiting embodiment, the processor 114 implements one or more algorithms to perform data prediction and trend analysis on at least one of the LRU data, the aircraft systems data, the fault data, and the test data. The algorithms can include, but are not limited to, a linear regression algorithm, a time-series analysis algorithm, exponential smoothing, a machine learning algorithm, and a neural network or a long short-term memory network (LSTM). The processor 114 can then store results of the data prediction and trend analysis in at least one the LRU data partition 118, the aircraft systems data partition 120, the fault data partition 122, and the test data partition 124.

With continued reference to FIG. 1, the processor 114 may be programmed to exchange only select data with users (e.g., customers) that do not have full access to the LRU 110. In one or more non-limiting embodiments, the processor 114 is configured to receive a low-priority data signal 104 in the form of a data request via the data communication interface 112. The data request can be a request from a customer to obtain a configuration data package pertaining to the operation of the LRU and/or the flight of the aircraft 100. The data request can include information indicating that the user is a customer that is authorized limited access to the data stored in the memory unit 116. For example, the customer may be authorized to receive LRU data and flight data, but not the fault data and/or the test data. Based on the data request, the processor 114 can obtain the LRU configuration data package from the LRU data partition 118 and/or the flight configuration data package from the aircraft systems data partition 120, and deliver the obtained configuration data package(s) 106 to the aircraft communication bus 102 via the data communication interface 112.

Figure 2:
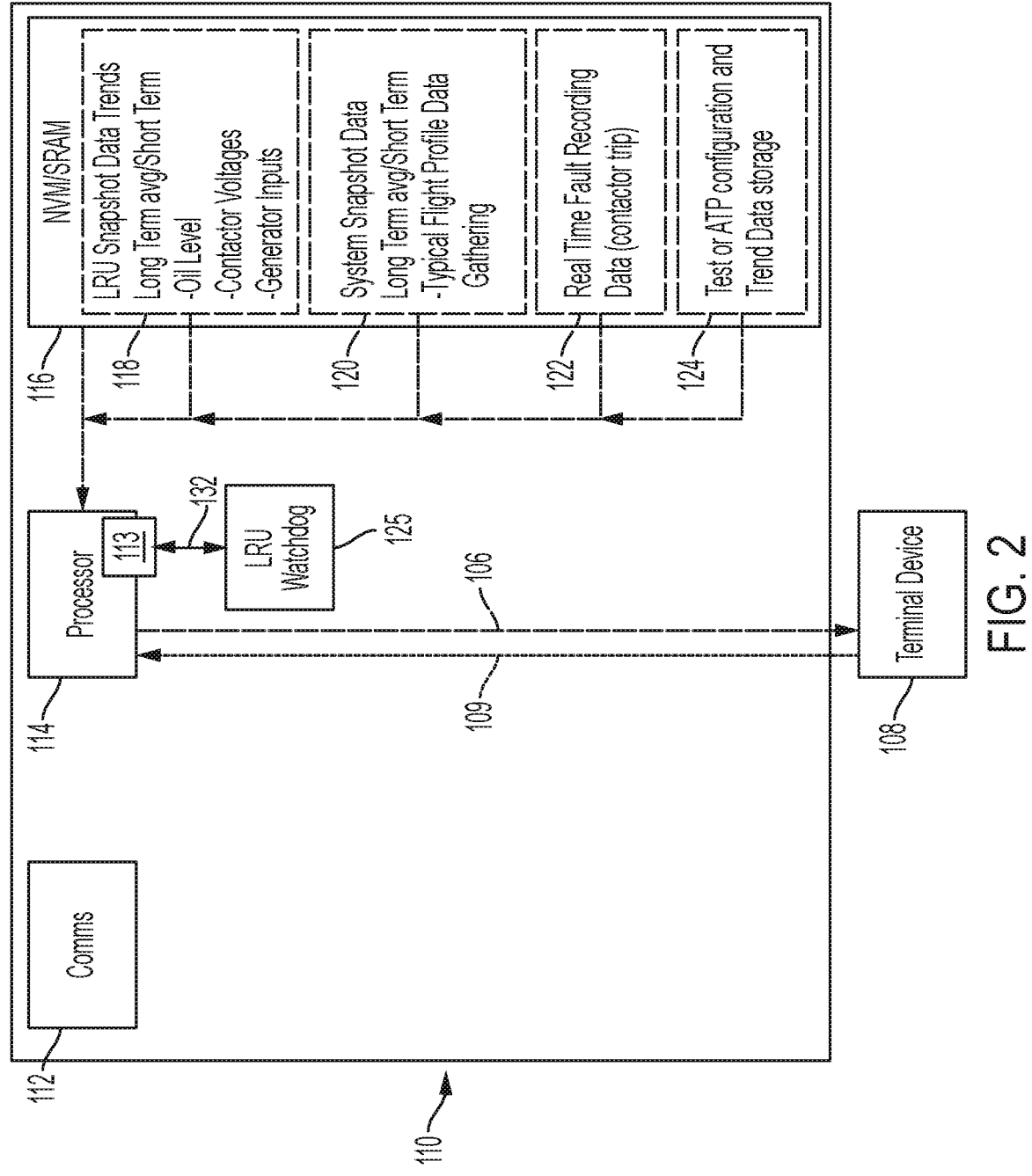
FIG. 2 is a block diagram illustrating a line replaceable unit in signal communication with a terminal device.

Turning now to FIG. 2, the LRU 110 is illustrated in signal communication with an external terminal device 108 that is operated by a user that is authorized to have full access to the memory unit 116. For example, the LRU 110 can be removed from the aircraft for maintenance and the external terminal device 108 can be connected to the LRU 110 to obtain one or more configuration data packages to perform a diagnostic analysis. In one or more non-limiting embodiments, the external terminal device 108 can be connected directly to the processor 114 and configured to send a memory access request 109. In a non-limiting embodiment, the memory access request 109 includes information indicating that the user has unlimited access to the data stored in the memory unit 116. Based on the memory access request 109, the processor 114 can deliver one or more configuration data packages 106 from one or a combination of the LRU data partition 118, the aircraft systems data partition 120, the fault data partition 122, and the test data partition 124.

The processor 114 can also include short-term and/or long-term trend analytics in the configuration data packages 106, which may indicate the trending health of the LRU 110 and/or one or more aircraft systems of the aircraft 100. The aircraft tail number stamp included in the configuration data packages 106 can also indicate which aircraft is associated with the LRU 110. In this manner, maintenance technicians can conveniently determine which aircraft systems may require further service.

In one or more non-limiting embodiments, the external terminal device 108 can submit a memory access request for one or more fault configuration data packages. Based on the request, the processor 114 can map the fault timestamp for each fault configuration data packages stored in the fault data partition 122 to the matching LRU timestamp corresponding to the LRU configuration data package stored in LRU data partition 118 and/or to aircraft systems configuration data package stored in the aircraft systems data partition 120, and then deliver the fault configuration data packages 109 the LRU configuration data package 109, and/or the aircraft systems configuration data package 109. In this manner, a maintenance technician can compare fault events occurring at a given timestamp to the LRU data and/or aircraft systems data existing at the given timestamp to determine the logical states or parameters of the LRU and/or aircraft systems at the time the fault occurred and what sequence of earlier states or parameters of the LRU and/or aircraft systems may have contributed to the fault event.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A line replaceable unit (LRU) comprising:
   a data communication interface configured to receive identification (ID) data from an aircraft communication bus;
   an aircraft systems interface configured to receive aircraft systems data corresponding to an operation of at least one aircraft system;
   an LRU data interface configured to receive LRU data, the LRU data indicating at least one of a status and a configuration of the LRU;
   a processor in signal communication with the data communication interface, the processor configured to process the aircraft systems data and the LRU data and determine at least one data category; and
   a memory unit in signal communication with the processor, the memory unit including a plurality of data partitions, each of the plurality of data partitions are assigned to a given data category among a plurality of different data categories,
   wherein the processor is configured to:
   determine a time at which the aircraft systems data was received based on the time stamp data;
   determine a flight event based on the aircraft systems data;
   assign a time stamp to the flight event indicating a time at which the flight event occurred;
   generate at least one configuration data package by combining the ID data with one or both of the aircraft systems data and the LRU data, and store the at least one configuration data package in a given data partition among a plurality of different data partitions that is assigned to the data category of the at least one configuration data package.

2. The LRU of claim 1, wherein the ID data includes one or both of timestamp data and tail number stamp data via the data communication interface.

3. The LRU of claim 2, wherein the at least one data category includes LRU data, aircraft systems data, fault data, and test data; and
   wherein the plurality of different data partitions includes an LRU data partition, an aircraft systems data partition, a fault data partition, and a test data partition.

4. The LRU of claim 1, wherein the memory unit includes non-volatile memory (NVM) or static random access memory (SRAM) having a storage capacity ranging from 500 megabytes (MB) to 2 terabytes (TB).

5. The LRU of claim 1, wherein the data communication interface operates according to at least one of an aeronautical radio, incorporated (ARINC) protocol, a controller area network (CAN), and a time-triggered protocol (TTP).

6. The LRU of claim 1, wherein the processor implements one or more algorithms to perform data prediction and trend analysis on a plurality of configuration data packages stored in the given data partition.

7. The LRU of claim 6, wherein the processor is configured to store results of the data prediction and trend analysis in the given data partition corresponding to the data category of the at least one configuration data package.

8. The LRU of claim 1, wherein the processor is configured to receive a data request via the data communication interface, and to deliver the at least one configuration data package corresponding to the data request to the aircraft communication bus via the data communication interface.

9. The LRU of claim 1, wherein the processor is configured to receive a data request via the data communication interface, and to deliver the results of the data prediction and trend analysis to the aircraft communication bus via the data communication interface based on the data request.

10. The LRU of claim 1, wherein the processor is configured to establish signal communication with an external terminal device to receive a memory access request for at least one of a targeted configuration data package and results of a data prediction and trend analysis.

11. The LRU of claim 10, wherein the processor delivers at least one of the targeted configuration data package and the results of the data prediction and trend analysis to the external terminal device based on the memory access request.

12. A method of storing data in a line replaceable unit (LRU), the method comprising:
    receiving, at a data communication interface of the LRU, identification (ID) data deliver from an aircraft communication bus;
    delivering aircraft system data from at least one aircraft system to an aircraft systems interface of the LRU;
    delivering LRU data corresponding indicative of the operation of the LRU to an LRU data interface of the LRU;
    processing, using a processor of the LRU, the aircraft systems data and the LRU data and determine at least one data category;
    combining, using the processor, the ID data with one or both of the aircraft systems data and the LRU data to generate at least one configuration data package corresponding to the at least one data category;
    assigning each data partition among a plurality of different data partitions included in a memory unit to given data category among a plurality of different data categories;
    determining a time at which the aircraft systems data was received based on the time stamp data;
    determining a flight event based on the aircraft systems data;
    assigning a time stamp to the flight event indicating a time at which the flight event occurred;
    generating at least one configuration data package by combining the ID data with one or both of the aircraft systems data and the LRU data; and
    storing, by the processor, the at least one configuration data package in the given data partition among the plurality of different data partitions of the memory unit that is assigned to the data category of the at least one configuration data package.

13. The method of claim 12, wherein the ID data includes one or both of timestamp data and tail number stamp data via the data communication interface.

14. The method of claim 13, wherein at least one data category includes a LRU data, aircraft systems data, fault data, and test data; and
    wherein the plurality of different data partitions includes an LRU data partition, an aircraft systems data partition, a fault data partition, and a test data partition.

15. The method of claim 12, wherein the memory unit includes non-volatile memory (NVM) or static random access memory (SRAM) having a storage capacity ranging from 500 megabytes (MB) to 2 terabytes (TB).

16. The method of claim 12, wherein the data communication interface operates according at least one of an aeronautical radio, incorporated (ARINC) protocol, a controller area network (CAN), and a time-triggered protocol (TTP).

17. The method of claim 12, further comprising:
    performing, by the processor, data prediction and trend analysis on the at least one configuration data package stored in the given data partition, and
    storing results of the data prediction and trend analysis in the given data partition corresponding to the data category of the at least one configuration data packages.

18. The method of claim 12, further comprising at least one of:
    delivering a data request to the processor; and delivering the at least one configuration data package corresponding to the data request to the aircraft communication bus via the data communication interface; and
    delivering a data request via the data communication interface; and delivering the results of the data prediction and trend analysis to the aircraft communication bus via the data communication interface based on the data request.

19. The method of claim 12, further comprising:
    generating, by an external terminal device, a memory access request for at least one of a targeted configuration data package and results of a data prediction and trend analysis, and
    delivering, by the processor, at least one of the targeted configuration data package and the results of the data prediction and trend analysis to the external terminal device based on the memory access request.

20. A line replaceable unit (LRU) comprising:
    a data communication interface configured to receive identification (ID) data from an aircraft communication bus and to receive aircraft systems data output from at least one sensor, the ID data including time stamp data;
    an aircraft systems interface configured to receive aircraft systems data corresponding to an operation of at least one aircraft system;
    an LRU data interface configured to receive LRU data, the LRU data indicating at least one of a status and a configuration of the LRU;
    a processor in signal communication with the data communication interface, the processor configured to process the aircraft systems data and the LRU data and determine at least one flight event category; and
    a memory unit in signal communication with the processor, the memory unit including a plurality of data partitions, each of the plurality of data partitions are assigned to a given flight event category among a plurality of different flight event categories,
    wherein the processor is configured to:
    determine a time at which the aircraft systems data was received based on the time stamp data,
    determine a flight event based on the aircraft systems data;
    assign a time stamp to the flight event indicating a time at which the flight event occurred;
    generate a configuration data package including flight event data indicative of the flight event and the time stamp data indicating the date and time at which the flight event occurred; and store the configuration data package in a given data
partition among a plurality of different data partitions
that is assigned to the flight event category matching
the flight event included in the configuration data
package.

*   *   *   *   *